United States Patent
Wicks et al.

(10) Patent No.: US 6,624,746 B1
(45) Date of Patent: Sep. 23, 2003

(54) MUSICAL EVENT INFORMATION PAGER AND PAGING SYSTEM

(75) Inventors: James E. Wicks, San Francisco, CA (US); Eduardo Sciammarella, Hoboken, NJ (US)

(73) Assignees: Sony Corporation, Tokyo (JP); Sony Electronics, Inc., Park Ridge, NJ (US)

(*) Notice: Subject to any disclaimer, the term of this patent is extended or adjusted under 35 U.S.C. 154(b) by 950 days.

(21) Appl. No.: 08/802,578

(22) Filed: Feb. 19, 1997

(51) Int. Cl.[7] .................................................. H04Q 1/30
(52) U.S. Cl. ..................................... 340/311.1; 340/7.2
(58) Field of Search ............................... 340/311.1, 905, 340/990, 825.44, 7.29, 7.1, 7.2

(56) References Cited

U.S. PATENT DOCUMENTS

| | | | |
|---|---|---|---|
| 4,415,065 A | | 11/1983 | Sandstedt |
| 4,812,843 A | * | 3/1989 | Champion, III et al. .... 340/905 |
| 4,951,039 A | | 8/1990 | Schwendeman et al. |
| 5,173,688 A | | 12/1992 | DeLuca et al. |
| 5,331,431 A | | 7/1994 | Jasinski |
| 5,446,678 A | | 8/1995 | Saltzstein et al. |
| 5,452,356 A | | 9/1995 | Albert |
| 5,481,255 A | | 1/1996 | Albert et al. |
| 5,491,785 A | | 2/1996 | Robson et al. |
| 5,495,344 A | | 2/1996 | Callaway, Jr. et al. |
| 5,508,695 A | | 4/1996 | Nelson et al. |
| 5,535,428 A | | 7/1996 | King et al. |
| 5,630,207 A | * | 5/1997 | Gitlin et al. ............. 340/311.1 |
| 5,638,450 A | * | 6/1997 | Robson ................... 340/311.1 |
| 5,649,289 A | * | 7/1997 | Wang et al. ............... 455/31.3 |

* cited by examiner

Primary Examiner—Brent A. Swarthout
(74) Attorney, Agent, or Firm—Rader, Fishman & Grauer PLLC; Ronald P. Kananen, Esq.

(57) ABSTRACT

A pager and paging system are adapted to provide music enthusiasts with information regarding musical events which is otherwise generally available. A subscriber of the musical information service provides the service provider with an interest profile detailing the subscriber's musical interests. The service provider compiles information regarding musical events, compares the compiled information to the profile, and transmits information matching the profile to the subscriber's pager. In a two-way paging system, the information may not be transmitted until a request is sent to the system. The system may also determine the pager's general location and provide information relevant to that locale.

11 Claims, 3 Drawing Sheets

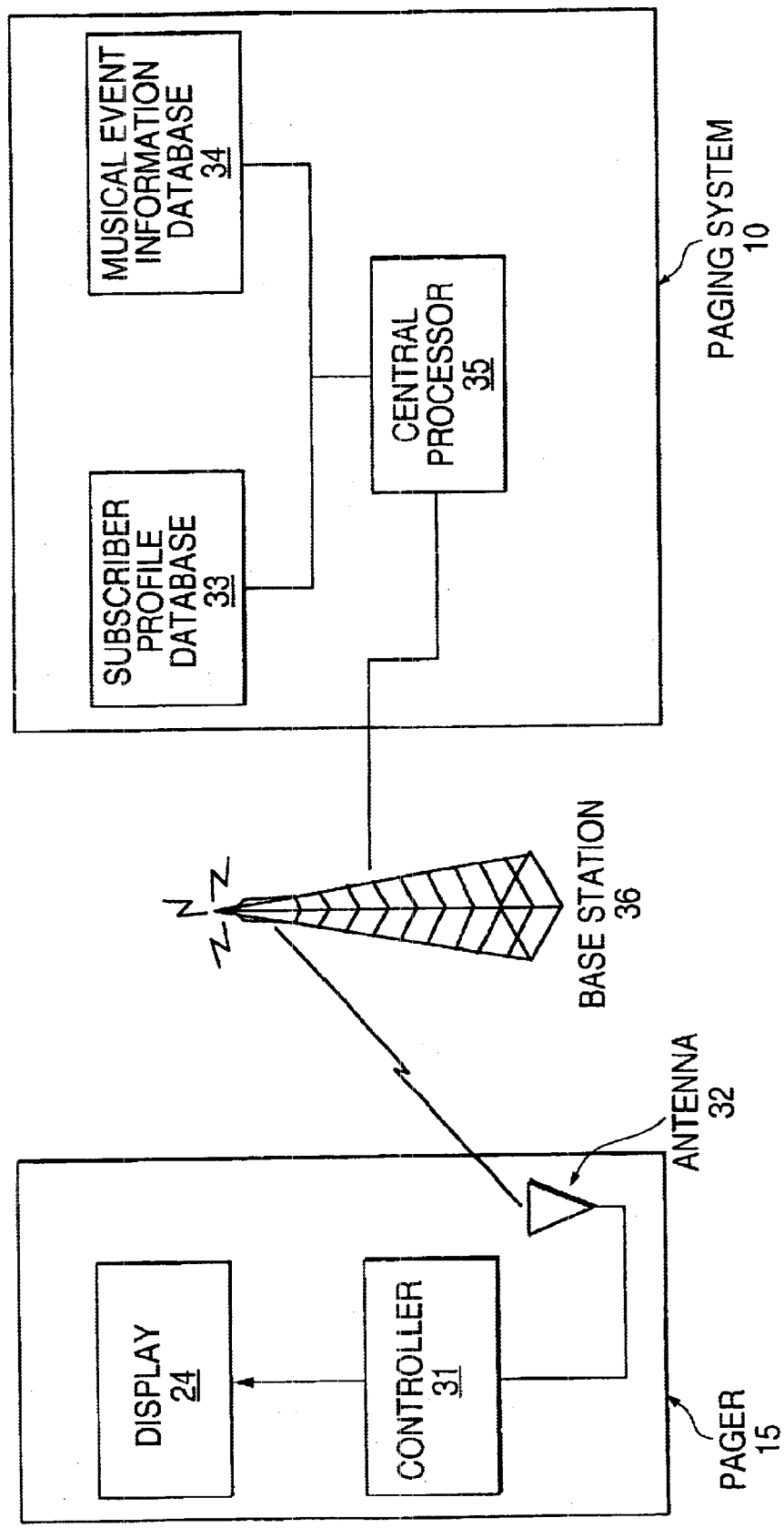

MUSICAL EVENT INFORMATION PAGER AND PAGING SYSTEM

FIELD OF THE INVENTION

The present invention relates generally to the field of wireless pagers. More particularly, the present invention relates to the application of wireless pager technology to the distribution of information about musical events such as live performances and dancing.

BACKGROUND OF THE INVENTION

Portable radio receivers and transceivers, such as wireless pagers, have become increasingly popular as a means of communication. Pagers are typically carried by users who wish or need to receive communications when they are away from a telephone or computer, or are unable to predict where they may be reached at a given time.

In general, the user of a pager purchases the unit and enters into a contact with a service provider. As shown in FIG. 1, when someone 12 wishes to page a particular user, they contact the user's service provider 11, identify the user to be paged (perhaps with a personal identification number), and may give a message to the service provider 11 that is to be broadcast to the user's pager 15.

The service provider 11 maintains a network of radio transceiver base stations 13, 14 which are spread throughout the service area covered by the service provider. The transmitting base stations 13 are distributed so that transmissions from at least one base station can be received by a pager 15 anywhere in the service area.

In a simplistic system, when the service provider 11 receives a request to page a user 15, the page is broadcast by all the base stations 13 in the system. Thus, if the pager 15 is located anywhere in the service area, it will receive the page. The pager 15 will then alert the user that a page has been received with, for example, an audible or vibratory alert signal.

In a more sophisticated system, the pager 15 may have the capability to not only receive a transmission from the service provider's system, but also to transmit an answer back to the system. This is referred to as two-way paging.

With these advances, the usefulness of pagers as a means of communication has expanded rapidly. Service providers have encouraged this expansion by experimenting with pagers as a means to disseminate information of interest to pager users. For example, as described in U.S. Pat. No. 5,508,695 to Nelson et al., incorporated herein by reference, a one-way pager system is used to relay sports or financial information to a pager user who has contracted with the service provider for that service.

However, there are many potential, undiscovered applications of pager technology which may provide pager users with, as yet unheard of, abilities to communicate. This is particularly true of the developing two-way pager systems. Accordingly, there is a need for improved methods and applications of pager technology to meet the information and communication demands of pager users.

Music is also extremely popular in modern society. Concerts and clubs featuring live music and/or dancing are plentiful, especially in urban areas. Due in part to this popularity, it can be extremely difficult for an enthusiast to monitor the performance schedules at the many places where an event of interest may occur or where a group or artist of interest may perform. The task is further complicated by the fact that many times such performance schedule information is unpublished, or the event or performance is impromptu.

Thus, there is a need for a means of communicating musical event information to interested members of the public, particularly information which is unpublished or otherwise inaccessible. There is also a need to be able to request and obtain such information from any location without the need to locate a newspaper, telephone, etc.

SUMMARY OF THE INVENTION

It is an object of the present invention to meet the above identified needs and others. Particularly, it is an object of the present invention to provide a pager technology in which a pager user can use a pager to receive musical event information.

This is a further object of the present invention to provide a pager technology with which the pager user can query a service provider for musical event information.

It is a further object of the present invention to provide a pager technology with which such musical event information is relayed in response to the pager user's query and, further, that such information is specific to the general area where the pager user is located.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects, the present invention may be embodied as a method of using a pager and paging system to provide musical event information to a pager user by compiling a musical event database of musical event information for transmission to the pager; compiling a subscriber profile database of profiles for subscribers which detail the type of musical event preferred by each particular subscriber; matching musical events listed in the musical event database with subscriber profiles; and transmitting the musical event information which matches a subscriber profile to that subscriber's pager.

This activity may be precipitated by the subscriber. Using his or her pager, the subscriber may generate a signal representing a request for musical event information; and transmit the signal to the paging system with the pager.

When the paging system receives the transmitted signal from the pager, a processor of the paging system identifies the signal as a request for musical event information; and identifies the pager transmitting the signal. The processor can then identify a subscriber profile corresponding to the pager identified as transmitting the signal requesting information, and match musical event information from musical event database with that subscriber profile corresponding.

When receiving a transmission from a subscriber's pager, the processor of the paging system also preferably identifies the base station of the paging system which is best receiving the pager transmission from the subscriber's pager; identifies the subscriber's pager from which the pager transmission is sent; identifies a corresponding subscriber profile; matches information from the musical event database with that corresponding subscriber profile; and screens the matching musical event information for information relevant to the location of the base station which is best receiving the pager transmission.

The method of the present invention also preferably includes compiling a musical event information database by having subscribers contact a service provider who is compiling the musical event information database with musical event information for inclusion database; and rewarding subscribers who volunteer musical event information to the service provider. Additionally, the method of compiling the musical information database may include receiving contacts from musical event promoters with information about musical events, especially where the information is otherwise unpublished.

BRIEF DESCRIPTION OF THE DRAWINGS

The accompanying drawings illustrate the present invention and are a part of the specification. Together with the following description, the drawings demonstrate and explain the principles of the present invention. In the drawings:

FIG. 3 is a diagram of a pager and paging system according to the principles of the present invention.

DETAILED DESCRIPTION OF THE PREFERRED EMBODIMENT

Figure 1:
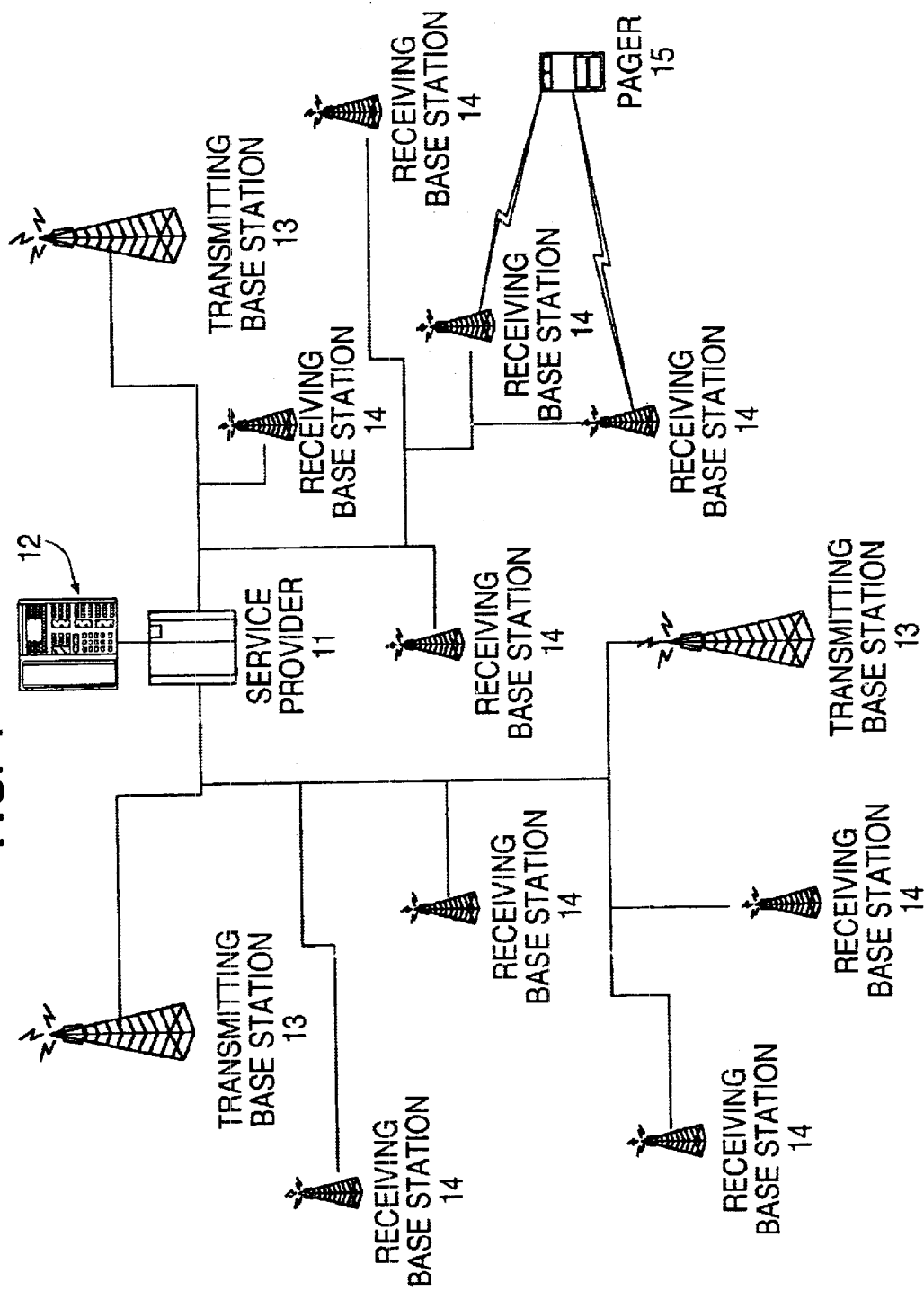
FIG. 1 is a schematic diagram of a conventional two-way paging network with which the present invention may be practiced.

Using the drawings, the preferred embodiment of the present invention will now be explained.

Under the principles of the present invention, the pager user may arrange for the musical event information service with the pager service provider. In the preferred embodiment, each pager user will file an interest profile with the service provider. The interest profile details those types of musical events in which the pager user has an interest.

For example, the pager user may specify certain performers, types of music, and types of dancing in which he or she has an interest. The pager user may also specify a geographic area in which such events would be of particular interest.

As shown in FIG. 3, the interest profiles will be stored in a subscriber profile database 33 which is part of the paging system 10. An interest profile will be obtained for every pager user who subscribes to the musical event information service.

The service provider will then gather information regarding musical events which is both published and unpublished. Such information will be compiled in a musical event information database 34 which is part of the paging system 10. Under the principles of the present invention, there are several advantageous methods by which a service provider will be able to obtain and compile the needed information at low cost.

As noted above, the musical event information which the pager user desires may often be unpublished or only available as the event is occurring. However, under the principles of the present invention, the service provider may overcome these problem.

For example, once the service provider begins offering the musical event information service, club owners and musical event promoters will have an incentive to contact the service provider with information about upcoming or on-going events. Even if information is otherwise unpublished, the cost of informing the service provider is negligible and will result in the information being disseminated to interested fans.

Moreover, those who subscribe to the service provider's information service for musical event information will have an interest in making the service provider's information network as efficient as possible. Accordingly, if an impromptu musical event occurs a service subscriber who happens to be in attendance may contact the service provider with information about the event that can be disseminated to other service subscribers. The service provider may even offer subscribers some incentive, e.g. temporarily reduced subscription rates, for providing such information.

The service provider will compile all such incoming information in database 34. A central processing unit 35 of the paging system 10 will then compare the compiled musical event information with the interest profiles in database 33 which have been provided by the various pager users who have subscribed to the service.

The central processing unit will then compile musical event information which matches the particular interests of each subscriber. The profile database 33 should also contain the information necessary to identify the pager 15 owned by the pager user whose profile is being matched so that the information matching that user's profile can be transmitted to that user's pager.

As described above, a pager system may support either one- or two-way paging. The principles of the present invention may be practiced on either type of system depending on the features of the service desired.

On a one-way paging system, the service provider will periodically page subscribers with the compiled musical event information specific to each subscriber's particular interests using the information from the profile database which identifies each subscriber's pager. The service provider may also page the user at any time with impromptu or particularly timely information.

The pager 15 is provided with an antenna 32 with which to receive transmissions from the paging system 10. The transmission of musical event information is thus received, via antenna 32, by a controller 31 of pager 15. The controller 31 drives display 24 to display the transmitted information for the pager user.

Providing the service of the present invention on a one-way paging system may be particularly cost-effective for younger subscribers with an intense interest in musical events, but inadequate resources to afford a more expensive two-way pager service.

Alternatively, a pager on a two-way paging system has the capability to transmit messages via antenna 32 to the paging system 10. This creates the ability to provide additional features for a subscriber under the principles of the present invention. For example, when a pager user is interested in attending a musical event, he or she uses a two-way pager to send a request to the paging system 10 for event information.

Figure 2:
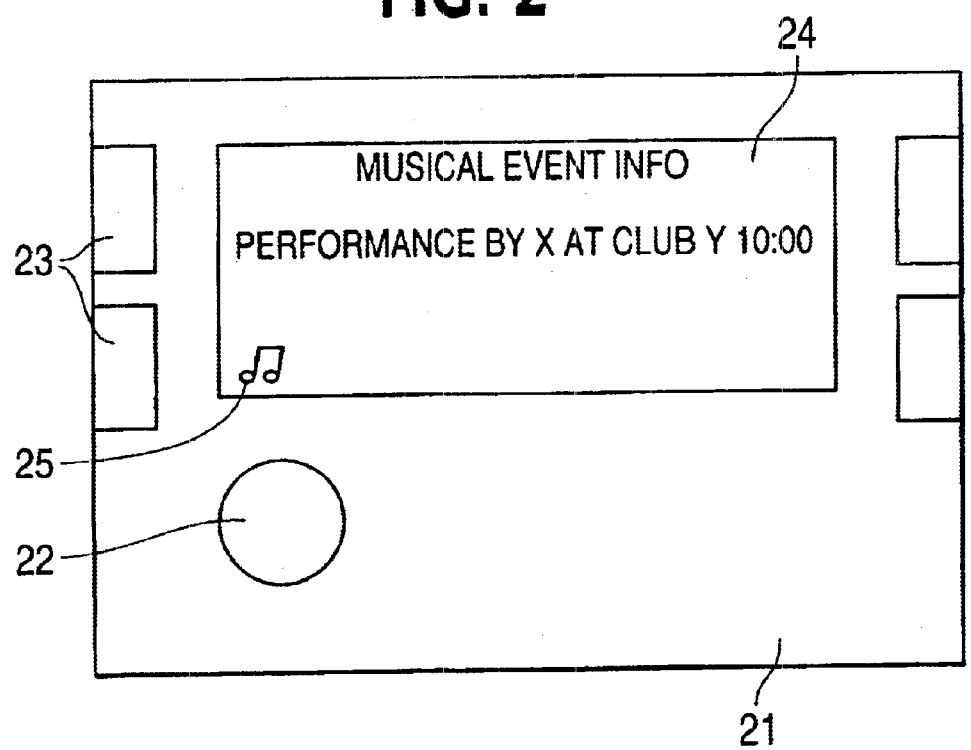
FIG. 2 is a diagram of a pager according to the principles of the present invention.

The user's pager may have a dedicated button which, when pushed, sends a request for musical event information to the service provider. In the preferred embodiment, illustrated in FIG. 2, the user's pager 21 includes a liquid crystal display 24. On the display 24, the user will find an icon 25 which, when selected, sends the request to the service provider for musical event information. Thus, the user is not disturbed by periodic pages regarding musical event information, but receives the information only on request.

Alternatively, the pager user may indicated on his or her interest profile that certain types of musical event information, perhaps information about impromptu events, should be transmitted whenever available even if not requested.

To select the icon 25, the pager is provided with buttons 23 for moving a cursor on display 24. When the cursor is highlighting the icon 25, the user pushes the select button 22. The pager then transmits the user's information request to the paging system as shown in FIG. 3. The user's pager may be programmed with this feature by the service provider when the contract between the service provider and the pager user is set up and the pager user indicates a desire for the musical event information service.

Also in a two-way paging system, the pager user's general location may be determined by the service provider so that information relevant the user's location is the first or only information transmitted to the user, depending on the user's indicated preferences.

Using FIG. 1, the method of determining the general location of a pager 15 using a two-way paging network will be briefly described. Because the strength of a transmission from a pager 15 is tightly constrained by the battery power available to the pager, a two-way paging system must include a greater number of receiving base stations 14 than transmitting base stations 13. The receiving base stations 14 are smaller and distributed more widely that transmitting base stations 13 in order to receive the relatively weak transmissions broadcast by individual pagers 15. The receiving base stations 14 must be sufficient in number and distribution to receive pager transmissions originating anywhere in the service area.

In a two-way paging system, a transmission from a pager 15 may be received by one or more receiving base stations 14. By determining which base station 14 is receiving the pager signal or, if more than one base station is receiving the pager signal, which base station is receiving the stronger pager signal, the general location of the pager 15 and, thus, the pager user can be determined. This is based on the generally true principle that the base station 14 receiving the strongest signal from the pager 15 is geographically closest to that pager.

Accordingly, the service provider 11 can determine the general location of the pager 15. The service provider can thus provider the pager user with musical event information which is specific to the general area where the pager user is. This prevents the pager user from receiving extraneous information about musical events which would be geographically inconvenient or impossible to attend.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of using a pager and paging system to provide musical event information toga pager user comprising:
    compiling a musical event database of musical event information for transmission to said pager;
    compiling a subscriber profile database comprising at least one profile for at least one subscriber, wherein said at least one profile comprises at least information regarding a type of musical event preferred by said at least one subscriber;
    matching musical events listed in said musical event database with a subscriber profile from said subscriber profile database; and
    transmitting radio signals carrying musical event information which matches a subscriber profile to that subscriber's pager with said paging system,
    wherein said compiling a musical event information database comprises having subscribers contact a service provider who is compiling said musical even information database with musical event information for inclusion in said musical event database.

2. A method as claimed in claim 1, further comprising the steps of:
    generating a signal representing a request for musical event information with said pager; and
    transmitting said signal to said paging system with said pager.

3. A method as claimed in claim 2, further comprising the steps of:
    receiving said transmitted signal from said pager with said paging system;
    identifying said signal as a request for musical event information; and
    identifying said pager transmitting said signal.

4. A method as claimed in claim 3, further comprising the steps of:
    identifying a subscriber profile corresponding to said pager identified as transmitting said signal requesting information; and
    performing said matching with respect to the subscriber profile corresponding to said pager identified as transmitting said signal requesting information.

5. A method as claimed in claim 1, further comprising rewarding subscribers who volunteer musical event information to said service provider.

6. A method as claimed in claim 1, wherein said compiling a musical event information database comprises receiving contacts from musical event promoters with information about musical events.

7. A method as claimed in claim 6, wherein said receiving contacts from musical event promoters comprises receiving contacts from musical event promoters with unpublished information about musical events.

8. A method of using a pager and paging system to provide musical event information to a pager user comprising:
    compiling a musical event database of musical event information for transmission to said pager;
    compiling a subscriber profile database comprising at least one profile for at least one subscriber, wherein said at least one profile comprises at least information regarding a type of musical event preferred by said at least one subscriber;
    matching musical events listed in said musical event database with a subscriber profile from said subscriber profile database; and
    transmitting radio signals carrying musical event information which matches a subscriber profile to that subscriber's pager with said paging system, and further comprising:
    receiving a pager transmission with said paging system from a subscriber's pager;
    identifying a base station of said paging system which is best receiving said pager transmission from a subscriber's pager;
    identifying said subscriber's pager from which said pager transmission is sent and identifying a corresponding subscriber profile;

performing said matching with respect to said corresponding subscriber profile; and screening the musical event information matching said corresponding subscriber profile for musical event information relevant to a location of said base station which is best receiving said pager transmission.

9. A paging system for disseminating musical event information comprising:

a musical event database of musical event information for transmission to subscriber's pagers;

a subscriber profile database comprising at least one profile for at least one subscriber, wherein said at least one profile comprises at least information regarding a type of musical event preferred by said at least one subscriber;

a processor for matching musical events listed in said musical event database with a subscriber profile from said subscriber profile database; and at least one transmitter for transmitting radio signals carrying musical event information which matches a subscriber profile to that subscriber's pager, and further comprising at least one receiver for receiving a signal from a subscriber's pager, wherein said processor further:

identifies a base station of said paging system which is best receiving said pager transmission from a subscriber's pager;

identifies said subscriber's pager from which said pager transmission is sent and identifies a corresponding subscriber profile;

performs said matching with respect to said corresponding subscriber profile; and screens the musical event information matching said corresponding subscriber profile for musical event information relevant to a location of said base station which is best receiving said pager transmission.

10. A paging system as claimed in claim 9, wherein said signal represents a request for musical event information, and said processor:

receives from said at least one receiver said transmitted signal from said pager;

identifies said signal as a request for musical event information; and identifies said pager transmitting said signal.

11. A paging system as claimed in claim 10, wherein said processor further:

identifies a subscriber profile corresponding to said pager identified as transmitting said signal requesting information; and performs said matching with respect to the subscriber profile corresponding to said pager identified as transmitting said signal requesting information.

* * * * *